United States Patent
Nomura et al.

(10) Patent No.: US 11,228,106 B2
(45) Date of Patent: Jan. 18, 2022

(54) ELECTRONIC COMPONENT, ANTENNA AND RF TAG

(71) Applicant: TODA KOGYO CORP., Hiroshima (JP)

(72) Inventors: Satoshi Nomura, Otake (JP); Jun Koujima, Otake (JP); Yasushi Nishio, Otake (JP); Manato Nakatsukasa, Otake (JP); Yasuhiko Fujii, Otake (JP)

(73) Assignee: TODA KOGYO CORPORATION, Hiroshima (JP)

(*) Notice: Subject to any disclaimer, the term of this patent is extended or adjusted under 35 U.S.C. 154(b) by 0 days.

(21) Appl. No.: 16/481,900

(22) PCT Filed: Jan. 29, 2018

(86) PCT No.: PCT/JP2018/002660
§ 371 (c)(1),
(2) Date: Jul. 30, 2019

(87) PCT Pub. No.: WO2018/143114
PCT Pub. Date: Aug. 9, 2018

(65) Prior Publication Data
US 2019/0393605 A1    Dec. 26, 2019

(30) Foreign Application Priority Data
Jan. 31, 2017 (JP) .............. JP2017-015132

(51) Int. Cl.
*H01Q 7/06* (2006.01)
*G06K 19/077* (2006.01)
*H01Q 1/22* (2006.01)

(52) U.S. Cl.
CPC ......... *H01Q 7/06* (2013.01); *G06K 19/07775* (2013.01); *H01Q 1/2208* (2013.01); *H01Q 1/2283* (2013.01)

(58) Field of Classification Search
CPC ....................................................... H01Q 7/06
(Continued)

(56) References Cited

U.S. PATENT DOCUMENTS

2009/0146898 A1* 6/2009 Akiho ............... H01Q 1/243
343/787
2015/0180128 A1* 6/2015 Ishikura ............ H01Q 1/2225
343/788

FOREIGN PATENT DOCUMENTS

| EP | 1 744 398 | 1/2007 |
| JP | 9-270314 | 10/1997 |

(Continued)

OTHER PUBLICATIONS

International Search Report for PCT/JP2018/002660, dated Apr. 3, 2018, 4 pages.
(Continued)

*Primary Examiner* — Rafferty D Kelly
(74) *Attorney, Agent, or Firm* — Nixon & Vanderhye P.C.

(57) ABSTRACT

The present invention relates to an electronic component, and also relates to an antenna for information communication using a magnetic field component, which is capable of satisfying both of downsizing and improvement in communication sensitivity. The electronic component of the present invention comprises a ferrite core and a coil, in which a ferrite constituting the ferrite core has a spinel structure and comprises Fe, Ni, Zn, Cu and Co as constitutional metal elements, and when contents of the respective constitutional metal elements in the ferrite are calculated in terms of $Fe_2O_3$, NiO, ZnO, CuO and CoO, contents of $Fe_2O_3$, NiO, ZnO, CuO and CoO in the ferrite are 46 to 50 mol %, 20 to 27 mol %, 15 to 22 mol %, 9 to 11 mol % and 0.01 to 1.0 mol %, respectively, based on a total content of $Fe_2O_3$, NiO, ZnO, CuO and CoO.

6 Claims, 3 Drawing Sheets

(58) Field of Classification Search
USPC .......................................................... 235/492
See application file for complete search history.

(56) References Cited

FOREIGN PATENT DOCUMENTS

| | | |
|---|---|---|
| JP | 2003-272914 | 9/2003 |
| JP | 2007-19891 | 1/2007 |
| JP | 2012-28799 | 2/2012 |
| JP | 2015-117172 | 6/2015 |
| WO | 2005/104298 | 11/2005 |

OTHER PUBLICATIONS

International Preliminary Report on Patentability issued in PCT/JP2018/002660 dated Aug. 6, 2019.

\* cited by examiner

ELECTRONIC COMPONENT, ANTENNA AND RF TAG

This application is the U.S. national phase of International Application No. PCT/JP2018/002660 filed 29 Jan. 2018, which designated the U.S. and claims priority to JP Patent Application No. 2017-015132 filed 31 Jan. 2017, the entire contents of each of which are hereby incorporated by reference.

TECHNICAL FIELD

The present invention relates to an electronic component having enhanced operability at a high frequency, and also relates to an antenna for information communication using a magnetic field component. The antenna according to the present invention is capable of satisfying both of downsizing and improvement in communication sensitivity.

BACKGROUND ART

With the recent progress of reduction in size and weight of domestic and industrial electronic equipments, etc., there is an increasing need for electronic components used in the aforementioned various electronic equipments which have a reduced size and can be operated with a still higher efficiency and at a still higher frequency.

For example, with the development of radio communication technologies including RFID, there is an increasing demand for antennas that are capable of saving an installation space and excellent in communication characteristics. A planar loop antenna has been used in non-contact IC cards, etc., owing to a small thickness thereof. However, such an antenna having a planar shape requires not only a large installation area, but also poses such a problem that if any metal material approaches to the antenna, an image having an opposite phase to that of the antenna is produced on the metal material, so that the antenna loses its sensitivity.

In an antenna of such a type that an electromagnetic wave is transmitted and received using a magnetic material, a conductive wire is wound around a core formed of the magnetic material to form a coil, and a magnetic field component coming from outside is allowed to pass through the magnetic material and undergo electromagnetic induction through the coil to convert the magnetic field component into a voltage (or current). The antenna of the aforementioned type has been widely used in small-size radios and TVs. In addition, the antenna has also been used in a non-contact object identification device called an RF tag which has recently widely become spread.

There is also known a magnetic antenna as an antenna using a magnetic material which comprises a central magnetic layer around which a coil-shaped conductive material is wound, an insulating layer that is formed on one or both outside surfaces of the magnetic layer on which the coil-shaped magnetic material is provided, and a conductive layer that is formed on one or both outside surfaces of the aforementioned insulating layers (Patent Literature 1). The aforementioned magnetic antenna can maintain a function as an antenna even when coming into contact with a metal material.

CITATION LIST

Patent Literature

Patent Literature 1: Japanese Patent Application Laid-open (KOKAI) No. 2007-19891

SUMMARY OF INVENTION

Technical Problem

However, it has been required that the antennas used as the RF tag are further reduced in size owing to wide spread of their applications. In general, downsizing of the antennas tends to cause deterioration in communication sensitivity. For this reason, in the case where a still longer communication distance is needed, only the method described in the aforementioned Patent Literature 1 is insufficient to achieve both downsizing and high communication sensitivity.

In consequence, an object of the present invention is to provide an antenna that can be improved in communication sensitivity and can realize further downsizing by using a ferrite core having a specific composition as a core of the antenna.

Solution to Problem

The above object or technical task of the present invention can be achieved by the following aspects of the present invention.

That is, in accordance with the present invention, there is provided an electronic component comprising a ferrite core and a coil, in which a ferrite constituting the ferrite core has a spinel structure and comprises Fe, Ni, Zn, Cu and Co as constitutional metal elements, and when contents of the respective constitutional metal elements in the ferrite are calculated in terms of $Fe_2O_3$, NiO, ZnO, CuO and CoO, contents of $Fe_2O_3$, NiO, ZnO, CuO and CoO in the ferrite are 46 to 50 mol %, 20 to 27 mol %, 15 to 22 mol %, 9 to 11 mol % and 0.01 to 1.0 mol %, respectively, based on a total content of $Fe_2O_3$, NiO, ZnO, CuO and CoO (Invention 1).

Also, according to the present invention, there is provided the electronic component as described in the above Invention 1, wherein a molar ratio of Zn to Ni (Zn/Ni) in the ferrite constituting the ferrite core is 0.58 to 1.0 (Invention 2).

Also, according to the present invention, there is provided the electronic component as described in the above Invention 1 or 2, wherein a molar ratio of Ni to Cu (Ni/Cu) in the ferrite constituting the ferrite core is 2.00 to 2.50 (Invention 3).

In addition, according to the present invention, there is provided an antenna comprising the electronic component as described in any one of the above Inventions 1 to 3 (Invention 4).

Also, according to the present invention, there is provided the antenna as described in the above Invention 4, wherein Q ($\mu'/\mu''$) of the ferrite core which is a ratio of a real part $\mu'$ to an imaginary part $\mu''$ of a complex magnetic permeability of the ferrite constituting the ferrite core as measured at 13.56 MHz is 50 to 170 (Invention 5).

Also, according to the present invention, there is provided the antenna as described in the above Invention 4 or 5, wherein a $\mu Q$ product of the ferrite constituting the ferrite core as measured at 13.56 MHz is not less than 9000 (Invention 6).

Furthermore, according to the present invention, there is provided an RF tag comprising the antenna as described in any one of the above Inventions 4 to 6 to which IC is mounted (Invention 7).

Also, according to the present invention, there is provided the RF tag as described in the above Invention 7 which is coated with a resin (Invention 8).

Advantageous Effects of Invention

The electronic component of the present invention exhibits excellent characteristics when operated at a high frequency. In particular, the electronic component of the present invention is suitable used as an antenna that is operated at a frequency band of 13.56 MHz.

The antenna of the present invention is more highly improved in communication sensitivity, and therefore capable of communicating information at a relatively long distance relative to an area and a volume thereof which are occupied by the antenna. In addition, the antenna of the present invention can maintain a sufficient communication distance even when further reducing a size of the antenna, and therefore can be suitably used as an antenna that is used in RFID applications at 13.56 MHz, etc.

Since the antenna of the present invention exhibits a high communication sensitivity even if it has a small size, it is possible to ensure a sufficient communication distance of the antenna even when the antenna is placed in such a condition that its communication sensitivity tends to be reduced by metals disposed in the vicinity of the antenna. As a result, the antenna of the present invention can be used in various applications including various kinds of cellular phones, containers, metal components, substrates, metal tools, metal dies, etc., without any limitation on installation space.

DESCRIPTION OF EMBODIMENTS

Figure 1:
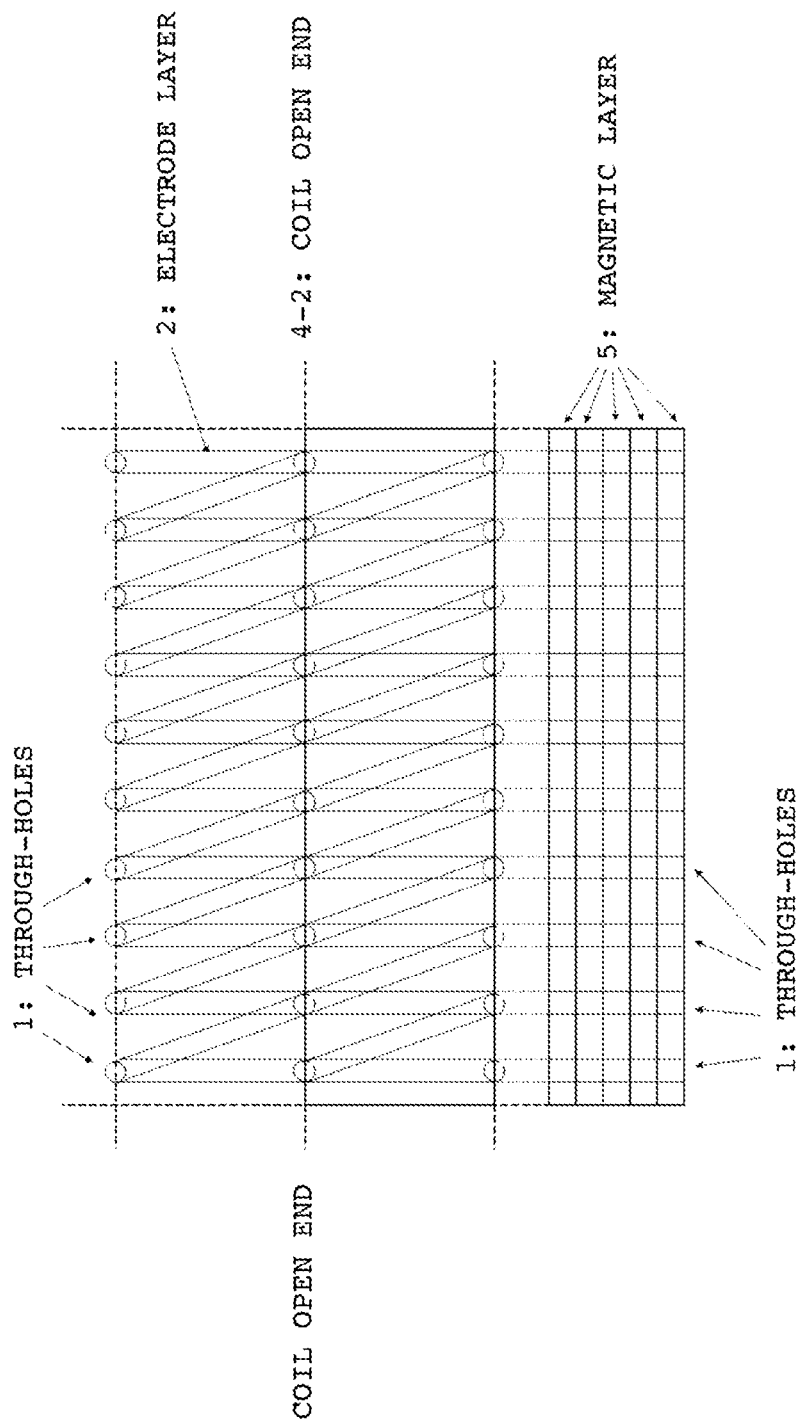
FIG. 1 is a construction view showing a coil portion of an electronic component according to the present invention.

The electronic component of the present invention is described below.

The electronic component of the present invention has a basic structure constructed of a ferrite core and a coil.

The ferrite constituting the aforementioned ferrite core is a magnetic material that has a spinel structure and comprises Fe, Ni, Zn, Cu and Co as constitutional metal elements, in which when contents of the respective constitutional metal elements in the ferrite are calculated in terms of $Fe_2O_3$, NiO, ZnO, CuO and CoO, contents of $Fe_2O_3$, NiO, ZnO, CuO and CoO in the ferrite are 46 to 50 mol %, 20 to 27 mol %, 15 to 22 mol %, 9 to 11 mol % and 0.01 to 1.0 mol %, respectively, based on a total content (100%) of $Fe_2O_3$, NiO, ZnO, CuO and CoO. The feature of the present invention resides in that the constitutional metal elements include Co. This means that the ferrite used in the present invention is a ferrite integrally comprising Fe, Ni, Zn, Cu and Co. However, the ferrite used in the present invention is not a simple mixture of an ordinary ferrite constituted of Fe, Ni, Zn and Cu with a Co component such as CoO, and such a mixture is excluded from the concept of the ferrite used in the present invention. Meanwhile, the crystal structure of the ferrite can be determined by X-ray diffraction.

The content of Fe in the ferrite constituting the ferrite core used in the present invention is 46 to 50 mol % in terms of $Fe_2O_3$. When the content of Fe in terms of $Fe_2O_3$ in the ferrite is less than 46 mol %, μ' tends to be small, whereas when the content of Fe in terms of $Fe_2O_3$ in the ferrite is more than 50 mol %, it tends to be difficult to sinter the ferrite material. The content of Fe in terms of $Fe_2O_3$ in the ferrite is preferably 46.5 to 49.5 mol % and more preferably 47.0 to 49.0 mol %.

The content of Ni in the ferrite constituting the ferrite core used in the present invention is 20 to 27 mol % in terms of NiO. When the content of Ni in terms of NiO in the ferrite is less than 20 mol %, μ" tends to be large, whereas when the content of Ni in terms of NiO in the ferrite is more than 27 mol %, μ' tends to be small. The content of Ni in terms of NiO in the ferrite is preferably 20.5 to 26.5 mol % and more preferably 21.0 to 26.0 mol %.

The content of Zn in the ferrite constituting the ferrite core used in the present invention is 15 to 22 mol % in terms of ZnO. When the content of Zn in terms of ZnO in the ferrite is less than 15 mol %, μ' tends to be small, whereas when the content of Zn in terms of ZnO in the ferrite is more than 22 mol %, μ" tends to be large. The content of Zn in terms of ZnO in the ferrite is preferably 15.5 to 21.5 mol % and more preferably 15.8 to 21.0 mol %.

The content of Cu in the ferrite constituting the ferrite core used in the present invention is 9 to 11 mol % in terms of CuO. When the content of Cu in terms of CuO in the ferrite is less than 9 mol %, the ferrite material tends to exhibit poor sintering properties, so that it tends to produce a sintered body at a low temperature. Whereas, when the content of Cu in terms of CuO in the ferrite is more than 11 mol %, μ' tends to be small. The content of Cu in terms of CuO in the ferrite is preferably 9.5 to 10.9 mol %, more preferably 10.0 to 10.8 mol % and even more preferably 10.2 to 10.7 mol %.

The content of Co in the ferrite constituting the ferrite core used in the present invention is 0.01 to 1.0 mol % in terms of CoO. In the present invention, when the ferrite comprises Co, the Snoek's limit line of the ferrite is shifted to a high frequency side of the characteristic curve, so that it is possible to improve Q (μ'/μ") of the ferrite core which is a ratio of the real part μ' to the imaginary part μ" of the complex magnetic permeability of the ferrite core at a high frequency region (for example, at 13.56 MHz). However, when the content of Co in terms of CoO in the ferrite is more than 1.0 mol %, the magnetic permeability of the ferrite tends to be lowered, and the value Q of the ferrite core also tends to be reduced. The content of Co in terms of CoO in the ferrite is preferably 0.05 to 0.95 mol % and more preferably 0.10 to 0.90 mol %.

The ferrite constituting the ferrite core used in the present invention may also comprise various other elements in addition to the aforementioned elements unless the characteristics of the ferrite are adversely affected by inclusion thereof. In general, it is known that addition of Bi to the ferrite has the effect of reducing a sintering temperature of the ferrite. However, in the present invention, reduction of the sintering temperature of the ferrite and control of the crystal structure of the ferrite are accomplished by controlling the molar ratio of Zn to Ni (Zn/Ni) and the content of Cu in the ferrite. For this reason, if Bi is added to the ferrite, although it is expected to further reduce the sintering temperature of the ferrite, fineness of the crystal structure tends to be further promoted, and there tends to occur a high possibility that μ' or the μQ product of the ferrite tends to be deteriorated. Thus, it is undesirable to positively add Bi to the ferrite (i.e., it is preferred that the ferrite comprises no Bi). The ferrite is preferably constituted of Fe, Ni, Zn, Cu and Co solely as the constitutional metal elements thereof.

However, even in this case, the ferrite may also comprise the other metal elements that are inevitably mixed and included in the ferrite.

The ferrite composition of the ferrite core may be selected such that the ferrite material has a high magnetic permeability at a frequency band used, and a magnetic loss of the ferrite core becomes low. However, if the magnetic permeability of the ferrite becomes as large as more than necessary, the magnetic loss of the ferrite tends to be increased, so that such a ferrite tends to be unsuitable for manufacture of an antenna.

The molar ratio of Zn to Ni (Zn/Ni) which are included in the ferrite constituting the ferrite core used in the present invention is preferably 0.58 to 1.0. When controlling the molar ratio of Zn to Ni (Zn/Ni) to the aforementioned range, it is possible to control the magnetic permeability of the ferrite core to an adequate range, and therefore reduce a magnetic loss of the ferrite core. The molar ratio of Zn to Ni (Zn/Ni) in the ferrite is more preferably 0.59 to 0.95 and even more preferably 0.60 to 0.90.

The molar ratio of Ni to Cu (Ni/Cu) which are included in the ferrite constituting the ferrite core used in the present invention is preferably 2.00 to 2.50. When controlling the molar ratio of Ni to Cu (Ni/Cu) to the aforementioned range, it is possible to control the magnetic permeability of the ferrite core to an adequate range while maintaining good sintering properties of the ferrite core at a low temperature. The molar ratio of Ni to Cu (Ni/Cu) in the ferrite is more preferably 2.05 to 2.45 and even more preferably 2.10 to 2.40.

The antenna comprising the electronic component according to the present invention may be used, for example, in the applications of RFID tags. In the antenna, the real part $\mu'$ of the complex magnetic permeability of the ferrite core as measured at 13.56 MHz is preferably not less than 80. When the real part $\mu'$ of the complex magnetic permeability of the ferrite core at 13.56 MHz is less than 80, it is not possible to attain the value Q and the $\mu Q$ product as desired, so that the resulting antenna tends to fail to exhibit excellent communication characteristics. The real part $\mu'$ of the complex magnetic permeability of the ferrite core at 13.56 MHz is more preferably not less than 100 and even more preferably not less than 110.

In addition, in the antenna according to the present invention, the imaginary part $\mu''$ of the complex magnetic permeability of the ferrite core as measured at 13.56 MHz is preferably not more than 2. When the imaginary part $\mu''$ of the complex magnetic permeability of the ferrite core at 13.56 MHz is more than 2, even a slight change of the frequency tends to cause rapid increase of $\mu''$, and the value Q tends to be lowered, so that the resulting antenna tends to fail to exhibit excellent communication characteristics. The imaginary part $\mu''$ of the complex magnetic permeability of the ferrite core at 13.56 MHz is more preferably not more than 1.5 and even more preferably not more than 1.0.

In the antenna according to the present invention, the value Q ($\mu'/\mu''$) of the ferrite core which is a ratio of the real part $\mu'$ to the imaginary part $\mu''$ of the complex magnetic permeability of the ferrite core at 13.56 MHz is preferably 50 to 170. When the value Q ($\mu'/\mu''$) of the ferrite core is less than 50, the communication distance of the antenna tends to be shortened, so that it tends to be unsuitable for an antenna. The value Q ($\mu'/\mu''$) of the ferrite core at 13.56 MHz is more preferably 70 to 165 and even more preferably 80 to 160.

In the antenna according to the present invention, the $\mu Q$ product of the ferrite core which is a product of the real part $\mu''$ of the complex magnetic permeability of the ferrite core at 13.56 MHz and the value Q of the ferrite core is preferably not less than 9000. When the $\mu Q$ product of the ferrite core is less than 9000, it is not possible to attain excellent communication characteristics of the antenna. The $\mu Q$ product of the ferrite core is more preferably not less than 10000 and even more preferably not less than 12000.

The electronic component according to the present invention comprises a coil that is disposed outside the ferrite core and formed of a conductive material wound around the ferrite core. From the standpoint of suppressing variation of electrical characteristics of the electronic component such as inductance as well as from the standpoint of attaining high productivity of the electronic component, it is preferred that a ferrite base material constituting the ferrite core and the conductive material constituting the coil are co-fired with each other such that the coil is brought into close contact with an outside of the ferrite core. More specifically, the electronic component according to the present invention is preferably formed of a sintered body comprising the ferrite core and the coil.

As the conductive material constituting the coil, there may be used metals such as Ag or an Ag-based alloy, and copper or a copper-based alloy. Among these metals, preferred is Ag or an Ag-based alloy.

The electronic component according to the present invention preferably comprises an insulating layer on one or both outside surfaces of the coil formed of the conductive material which is disposed outside of the ferrite core. By providing the insulting layer, it is possible to obtain the electronic component that is stably operated with the coil well protected, and has uniform quality.

In the electronic component according to the present invention, as a material of the insulting layer, there may be used non-magnetic ferrite such as Zn-based ferrite, a glass-based ceramic material such as borosilicate-based glass, zinc-based glass and lead-based glass, or a mixture obtained by mixing the non-magnetic ferrite and the glass-based ceramic material at an adequate mixing ratio.

The ferrite used as the non-magnetic ferrite in the insulating layer may be selected from such a Zn-based ferrite composition that the resulting sintered body has a volume resistivity of not less than $10^8$ ●cm. For example, the Zn-based ferrite composition preferably comprises 45.0 to 49.5 mol % of $Fe_2O_3$, 17.0 to 45.0 mol % of ZnO and 4.5 to 15.0 mol % of CuO.

When the insulating layer is formed of a glass-based ceramic material, the glass-based ceramic material used may be selected such that its composition has a linear expansion coefficient that is not largely different from a linear expansion coefficient of the magnetic material used. More specifically, the glass-based ceramic material is selected such that the difference between the linear expansion coefficient of the glass-based ceramic material and the linear expansion coefficient of the magnetic ferrite used as the magnetic material falls within ±5 ppm/° C.

The electronic component according to the present invention may also comprise a conductive layer on an outside of the coil disposed on the ferrite core through the insolating layer. When the conductive layer is provided in the electronic component, even though any metal material approaches to the antenna, the change in resonance frequency of the antenna can be reduced, so that the resulting antenna can be stably operated and has a uniform quality.

The electronic component according to the present invention may be provided with a metal layer as the conductive layer. The metal layer is preferably in the form of a metal thin layer formed of Ag or an Ag-based alloy having a low resistance.

The electronic component according to the present invention is preferably in the form of a sintered body in which the aforementioned insulating layer and conductive layer are co-fired together with the ferrite base material of the ferrite core and the conductive material serving as the conductor so as to come into close contact with the ferrite core.

It has been desired that a small-size and high-sensitivity antenna as manufactured according to the present invention is applied to wearable equipments. In such a case, the size of the antenna is preferably not more than 20 mm square and not more than 20 mm in height, more preferably not more than 10 mm square and not more than 10 mm in height, and even more preferably not more than 8 mm square and not more than 8 mm in height.

The RF tag according to the present invention comprises the aforementioned antenna and an IC chip connected to the antenna. The RF tag according to the present invention is free of damage to its characteristics nevertheless the RF tag is coated with a resin. The antenna and the IC chip connected thereto are well protected in the RF tag, so that the resulting RF tag can be stably operated and has a uniform quality.

The method for manufacturing the electronic component according to the present invention is described below.

The electronic component according to the present invention may be manufactured by various methods capable of forming such a structure that the coil is wound around the ferrite core. Hereinafter, there is described the method for manufacturing the antenna by the LTCC technologies (Low Temperature Co-fired Ceramics) in which a sheet-like ferrite base material and a conductive material are laminated on each other to form a desired laminated structure, and then the resulting laminated structure is co-fired together to obtain the electronic component.

Figure 2:
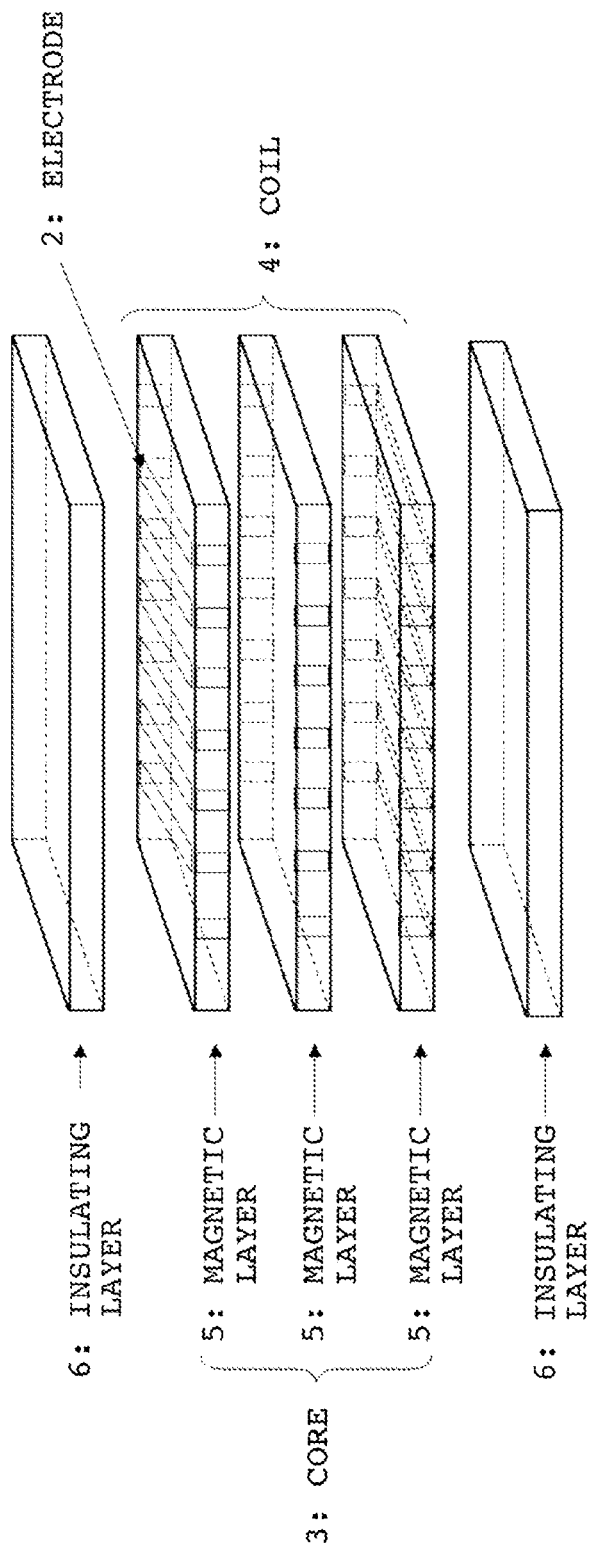
FIG. 2 is a conceptual view showing a laminated structure of an electronic component according to the present invention.

The laminated structure of the antenna as shown in FIGS. 1 and 2 is described below as an example thereof.

First, a mixture prepared by mixing magnetic particles and a binder is formed into a sheet shape to form a ferrite base material.

As the magnetic particles, there may be used ferrite calcined particles that comprise Fe, Ni, Zn, Cu and Co as constitutional metal elements, in which when contents of the respective constitutional metal elements in the ferrite are calculated in terms of $Fe_2O_3$, NiO, ZnO, CuO and CoO, contents of $Fe_2O_3$, NiO, ZnO, CuO and CoO in the ferrite are 46 to 50 mol %, 20 to 27 mol %, 15 to 22 mol %, 9 to 11 mol % and 0.01 to 1.0 mol %, respectively, based on a total content of $Fe_2O_3$, NiO, ZnO, CuO and CoO.

Next, magnetic layers (5) each formed of the ferrite base material are laminated together such that the resulting laminated structure has a desired whole thickness. Then, as shown in FIG. 1, a desired number of through-holes (1) are formed through the thus obtained laminate of the magnetic layers (5). The conductive material is then poured into the aforementioned respective through-holes (1). Also, an electrode layer (2) is formed on both surfaces of the laminate of the magnetic layers (5) which are perpendicular to the through-holes (1) such that a coil (wire winding) which is connected with the conductive material in the through-holes (1) is formed around the laminate. The conductive material poured into the through-holes (1) and the electrode layer (2) are allowed to cooperate with each other so as to form a coil (4) around a rectangular core constituted of the laminate of the magnetic layers (5). In this case, there is obtained such a structure in which both ends of the magnetic layer which forms the coil (4) are open ends on a magnetic circuit.

As the conductive material that is poured into the through-holes (1) or used for forming the electrode layer (2), there may be mentioned a metal-based conductive paste. Suitable examples of the metal-based conductive paste include an Ag paste and an Ag-based alloy paste.

The thus obtained sheet-like laminate is cut into a desired shape along a coil open end (4-2) including the through-holes (1) and then co-fired, or the laminate is co-fired and then cut into a desired shape along the coil open end (4-2) including the through-holes (1), thereby manufacturing the antenna according to the present invention which is constituted of a sintered body comprising the ferrite core (3) and the coil (4).

The sintering temperature of the aforementioned laminate is 800 to 1000° C. and preferably 850 to 920° C. When the sintering temperature of the laminate is lower than the aforementioned range, it tends to be difficult to attain desirable characteristics of µ', Q or the like. On the other hand, when the sintering temperature of the laminate is higher than the aforementioned range, it tends to be difficult to co-fire the laminate.

In addition, in the present invention, insulating layers (6) may be respectively formed on upper and lower surfaces of the laminate of the magnetic layers (5) on which the electrode layer (2) is formed. The schematic view of the antenna in which the insulating layers (6) are formed is shown in FIG. 2.

Also, in the antenna according to the present invention, a coil lead terminal and an IC chip connecting terminal which both are formed of the conductive material may be formed on the surface of the respective insulating layers (6) to mount an IC thereto.

In the antenna in which the aforementioned IC chip connecting terminal is formed, through-holes may be formed through the insulating layer (6) formed on at least one surface of the laminate of the magnetic layers (5) on which the electrode layer (2) is formed, and the conductive material is poured into the through-holes and connected to both ends of the coil (4) such that the coil lead terminal and the IC chip connecting terminal are connected in parallel or in series with each other through the conductive material on the surface of the insulating layer (6), followed by co-firing the resulting laminate.

Figure 3:
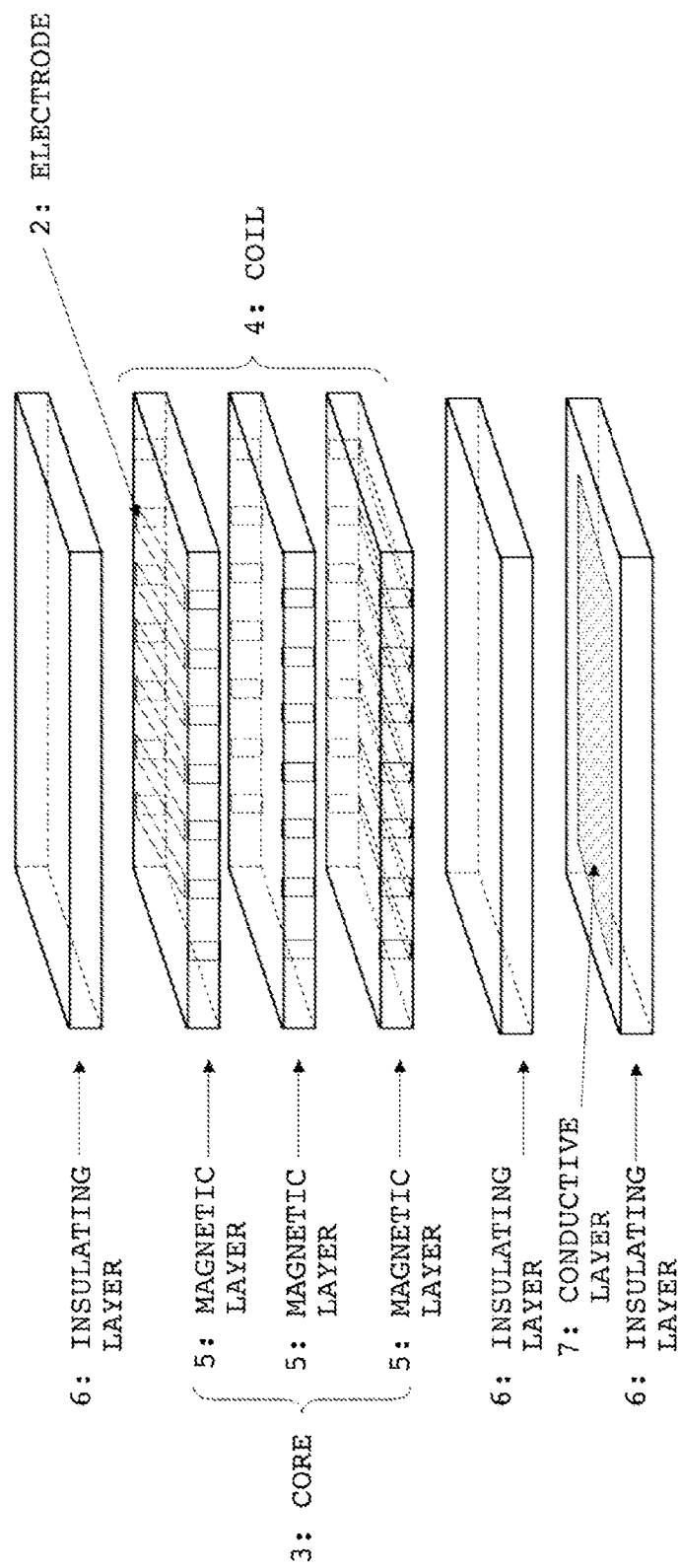
FIG. 3 is a conceptual view showing another embodiment of a laminated structure of an electronic component according to the present invention.

In addition, in the antenna according to the present invention, as shown in FIG. 3, a conductive layer (7) may be formed on an outside of the insulating layer (6). By providing the conductive layer (7) on the laminate of the magnetic layers (5) on which the coil (4) is formed, through the insulating layer (6) in the antenna, the change in resonance frequency of the antenna can be reduced even when the antenna is attached to a metal surface, and the coil can be prevented from coming into direct contact with the metal surface, so that it is possible to obtain an antenna that can be stably operated and has a uniform quality.

In addition, in the antenna according to the present invention, as shown in FIG. 3, an additional insulating layer (6) may be further formed on an outside surface of the conductive layer (7). Furthermore, a magnetic layer (5) may be further formed on an outside surface of the aforementioned insulating layer (6), or a further insulating layer (6) may be formed on an outside surface of the magnetic layer (5). With the aforementioned construction, it is possible to further reduce the change in characteristics of the antenna even when a metal material approaches to the antenna, and thereby further reduce the change in resonance frequency of the antenna.

The conductive layer (7) may be formed by any suitable methods. For example, the conductive layer (7) is preferably formed from a paste-like conductive material by an ordinary method such as printing and brush coating. Alternatively, a metal plate may be attached to an outside of the insulating layer (6) to thereby attain the same effect as given by provision of the conductive layer (7).

As the paste-like conductive material for forming the conductive layer (7), there may be used a metal-based conductive paste. Suitable examples of the metal-based conductive paste include an Ag paste and an Ag-based alloy paste.

In the case where the conductive layer (7) is formed outside of the insulating layer, the thickness of the conductive layer (7) is preferably 0.001 to 0.1 mm when calculated as its thickness after being subjected to the firing treatment.

In addition, in the antenna according to the present invention, a capacitor electrode may be disposed on an outside surface of at least one of the insulating layers (6) between which the coil (4) is sandwiched so as to contact with its upper and lower surfaces.

Meanwhile, in the antenna according to the present invention, the capacitor disposed on the upper surface of the insulating layer (6) may be formed by printing a parallel electrode or an interdigitated electrode, and further the capacitor may be connected in parallel or in series with the coil lead terminal.

In addition, in the antenna according to the present invention, a terminal for providing a variable capacitor may be formed on the upper surface of the insulating layer (6), and the coil lead terminal may be connected in parallel or in series with the coil lead terminal.

In addition, an insulating layer (6) may be further formed on an outside surface of the aforementioned insulating layer (6) on the upper surface of which the capacitor electrode is disposed. On an outside surface of the thus formed insulating layer (6), an electrode layer also serving as an IC chip connecting terminal may be formed, so that capacitors may be formed so as to sandwich the insulating layer (6) therebetween, and may be connected in parallel or in series with the IC chip connecting terminal.

In the antenna according to the present invention, through-holes (1) may be further formed through the insulating layer (6) formed on the lower surface of the coil (4), and the conductive material may be poured into the through-holes and connected to both ends of the coil (4), and a substrate connecting terminal may be formed from the conductive material on the lower surface of the insulating layer, followed by co-firing the obtained laminate. In this case, the resulting antenna can be easily bonded to a substrate that is formed of a ceramic material, a resin, etc.

The IC chip may be connected through an IC chip connecting terminal formed on the insulating layer. Alternatively, a wiring may be formed within the substrate so as to connect to the substrate connecting terminal formed on the lower surface of the antenna, whereby the IC chip may be connected to the antenna through the wiring formed within the substrate. The antenna according to the present invention can be used as an RF tag by connecting the IC chip to the antenna.

In addition, the RF tag according to the present invention may be coated with a resin. Examples of the resin used for coating the RF tag therewith include polystyrene, acrylonitrile styrene, acrylonitrile butadiene styrene, an acrylic resin, polyethylene, polypropylene, polyamide, polyacetal, polycarbonate, polyvinyl chloride, modified polyphenylene ether, polybutylene terephthalate, polyphenylene sulfide, etc.

<Function>

In the antenna according to the present invention, the ferrite core used therein is formed of a ferrite as a magnetic material comprising Fe, Ni, Zn, Cu and Co, in which when contents of Fe, Ni, Zn, Cu and Co in the ferrite are calculated in terms of $Fe_2O_3$, NiO, ZnO, CuO and CoO, contents of $Fe_2O_3$, NiO, ZnO, CuO and CoO in the ferrite are 46 to 50 mol %, 20 to 27 mol %, 15 to 22 mol %, 9 to 11 mol % and 0.01 to 1.0 mol %, respectively, based on a total content of $Fe_2O_3$, NiO, ZnO, CuO and CoO, and Q ($\mu'/\mu''$) of the ferrite core is 50 to 170. For this reason, it is possible to improve communication sensitivity of the antenna.

In the antenna according to the present invention, the composition of the magnetic particles constituting the ferrite core is well controlled, so that the sintered body can be obtained by sintering the ferrite at a low temperature. Therefore, it is possible to co-fire the core and the conductive material by utilizing the LTCC technologies.

In addition, the antenna obtained by co-firing a laminate comprising the ferrite core and the coil formed of the conductive material has a large μQ product, and therefore can be enhanced in communication sensitivity even when the antenna has a small size.

EXAMPLES

In the following, the present invention is described in more detail on the basis of preferred embodiment thereof by referring to FIG. 2.

Example 1

One hundred parts by weight of Ni—Zn—Cu ferrite calcined particles ($Fe_2O_3$: 48.59 mol %; NiO: 24.82 mol %; ZnO: 15.95 mol %; CuO: 10.37 mol %), 8 parts by weight of a butyral resin, 5 parts by weight of a plasticizer and 80 parts by weight of a solvent were mixed in a ball mill to prepare a slurry. The resulting slurry was applied on a PET film by a doctor blade to form a coating layer with a size of 150 mm square such that the thickness of the coating layer was 0.1 mm upon being sintered to form a molded sheet, thereby obtaining a green sheet for a magnetic layer (5). The thus obtained green sheet was sintered at a sintering temperature of 900° C. to obtain a ferrite core. The magnetic characteristics of the thus obtained ferrite core are shown in Table 1.

In addition, 100 parts by weight of Zn—Cu ferrite calcined particles ($Fe_2O_3$: 46.5 mol %; ZnO: 42.0 mol %; CuO: 11.5 mol %), 8 parts by weight of a butyral resin, 5 parts by weight of a plasticizer and 80 parts by weight of a solvent were mixed in a ball mill to prepare a slurry. The resulting slurry was applied on a PET film by a doctor blade to form a coating layer with the same size and thickness as those of the green sheet for the magnetic layer (5) to form a molded sheet, thereby obtaining a green sheet for an insulating layer (6).

Next, through-holes (1) were formed through the 10 green sheets for the magnetic layer (5) at predetermined positions thereof and filled with an Ag paste. An Ag paste was applied onto the surface of the green sheet on which an electrode layer (2) was to be provided, to thereby print an electrode pattern thereon. These ten green sheets prepared above were laminated together to form a laminate on which a coil-shaped conductive material was disposed outside of the laminated green sheets. The green sheet for the insulating layer (6) was laminated on the surface of the laminate on which the conductive material forming the electrode layer was printed.

The thus laminated green sheets were bonded together by applying a pressure thereto. The resulting laminate was cut along the through-hole (1) parting surfaces and the coil open ends (4-2), and the thus cut laminate was co-fired at 900° C. for 2 hr, thereby producing an antenna having a size of 10 mm in width×3 mm in length×2 mm in height and a number of turns of winding of 23 which was formed of a sintered body comprising the ferrite core and the coil (in FIG. 2, the number of turns of the coil winding is shown as being 7 turns for simplicity. In addition, the number of the magnetic layers (5) laminated is also shown as being 3 layers for simplicity. In the following other drawings, they are shown in the same way).

[Measurement of Ferrite Composition]

The composition the aforementioned respective ferrite calcined particles for production of the ferrite core was measured using a Simultaneous wavelength dispersive X-ray fluorescence spectrometer "Simultix 14" manufactured by Rigaku Corporation.

[Measurement of Magnetic Properties of Ferrite Core]

Particles prepared by mixing 15 g of the aforementioned ferrite calcined particles for production of the ferrite core and 1.5 mL of a 6.5% diluted PVA aqueous solution were charged into a metal die having an outer diameter of 20 mmϕ and an inner diameter of 10 mmϕ, and compressed and compacted under 1 ton/cm$^2$ using a pressing machine. The resulting compact was sintered at 900° C. for 2 hr under the same conditions as used for production of the antenna, thereby obtaining a ring core formed of the ferrite for measuring an initial magnetic permeability, Q and a μQ product of the ring core.

The initial magnetic permeability, Q and the μQ product of the ring core were measured at 13.56 MHz using an impedance/material analyzer "E4991A" manufactured by Agilent Technology Co., Ltd.

Example 2

The same procedure as in Example 1 was conducted except that the composition of the Ni—Zn—Cu ferrite calcined particles used for forming the magnetic layer was changed to the composition comprising 48.31 mol % of $Fe_2O_3$, 21.93 mol % of NiO, 19.18 mol % of ZnO, 10.29 mol % of CuO and 0.29 mol % of CoO, thereby manufacturing an antenna.

Example 3

The same procedure as in Example 1 was conducted except that the composition of the Ni—Zn—Cu ferrite calcined particles used for forming the magnetic layer was changed to the composition comprising 48.65 mol % of $Fe_2O_3$, 24.76 mol % of NiO, 16.10 mol % of ZnO, 10.35 mol % of CuO and 0.14 mol % of CoO, thereby manufacturing an antenna.

Example 4

The same procedure as in Example 1 was conducted except that the composition of the Ni—Zn—Cu ferrite calcined particles used for forming the magnetic layer was changed to the composition comprising 48.66 mol % of $Fe_2O_3$, 24.80 mol % of NiO, 16.08 mol % of ZnO, 10.37 mol % of CuO and 0.09 mol % of CoO, thereby manufacturing an antenna.

Example 5

The same procedure as in Example 1 was conducted except that the composition of the Ni—Zn—Cu ferrite calcined particles used for forming the magnetic layer was changed to the composition comprising 48.23 mol % of $Fe_2O_3$, 24.73 mol % of NiO, 15.91 mol % of ZnO, 10.52 mol % of CuO and 0.61 mol % of CoO, thereby manufacturing an antenna.

Example 6

The same procedure as in Example 1 was conducted except that the composition of the Ni—Zn—Cu ferrite calcined particles used for forming the magnetic layer was changed to the composition comprising 48.30 mol % of $Fe_2O_3$, 24.64 mol % of NiO, 15.88 mol % of ZnO, 10.35 mol % of CuO and 0.83 mol % of CoO, thereby manufacturing an antenna.

Comparative Example 1

The same procedure as in Example 1 was conducted except that the composition of the Ni—Zn—Cu ferrite calcined particles used for forming the magnetic layer was changed to the composition comprising 48.22 mol % of $Fe_2O_3$, 26.54 mol % of NiO, 14.73 mol % of ZnO and 10.51 mol % of CuO, thereby manufacturing an antenna.

Comparative Example 2

The same procedure as in Example 1 was conducted except that the composition of the Ni—Zn—Cu ferrite calcined particles used for forming the magnetic layer was changed to the composition comprising 48.61 mol % of $Fe_2O_3$, 27.39 mol % of NiO, 13.57 mol % of ZnO and 10.43 mol % of CuO, thereby manufacturing an antenna.

TABLE 1

| | Ferrite sintered body | | | | |
|---|---|---|---|---|---|
| | $Fe_2O_3$ (mol %) | NiO (mol %) | ZnO (mol %) | CuO (mol %) | CoO (mol %) |
| Example 1 | 48.59 | 24.82 | 15.95 | 10.37 | 0.27 |
| Example 2 | 48.31 | 21.93 | 19.18 | 10.29 | 0.29 |
| Example 3 | 48.65 | 24.76 | 16.10 | 10.35 | 0.14 |
| Example 4 | 48.66 | 24.80 | 16.08 | 10.37 | 0.09 |
| Example 5 | 48.23 | 24.73 | 15.91 | 10.52 | 0.61 |
| Example 6 | 48.30 | 24.64 | 15.88 | 10.35 | 0.83 |
| Comp. Example 1 | 48.22 | 26.54 | 14.73 | 10.51 | — |
| Comp. Example 2 | 48.61 | 27.39 | 13.57 | 10.43 | — |

| | Ferrite sintered body | | | | | |
|---|---|---|---|---|---|---|
| | Zn/Ni (—) | Ni/Cu (—) | μ' 13.56 MHz (—) | μ" 13.56 MHz (—) | Q 13.56 MHz (—) | μQ product 13.56 MHz (—) |
| Example 1 | 0.64 | 2.39 | 115 | 0.8 | 148 | 16953 |
| Example 2 | 0.87 | 2.13 | 166 | 1.8 | 90 | 14939 |

TABLE 1-continued

| | | | | | | |
|---|---|---|---|---|---|---|
| Example 3 | 0.65 | 2.39 | 115 | 1.0 | 114 | 13076 |
| Example 4 | 0.65 | 2.39 | 125 | 1.6 | 76 | 9513 |
| Example 5 | 0.64 | 2.35 | 94 | 0.6 | 158 | 14852 |
| Example 6 | 0.64 | 2.38 | 86 | 0.6 | 149 | 12814 |
| Comp. Example 1 | 0.56 | 2.53 | 127 | 4.1 | 31 | 3937 |
| Comp. Example 2 | 0.50 | 2.63 | 108 | 2.4 | 45 | 4860 |

[Measurement of Resonance Frequency and Q of Antenna]

The resonance frequency and Q of the antenna were measured using an impedance analyzer "4991A" and a coaxial probe manufactured by Agilent Technology Co., Ltd. The probe was connected to both ends of the coil of the antenna to measure the resonance frequency and the value Q of the antenna. The value Q of the antenna was determined according to the formula of $\omega L/R$ wherein $\omega$ is an angular frequency; L is a self inductance of the coil; and R is a loss resistance of the coil. The results of the measurement are shown in Table 2.

[Measurement of Communication Distance]

An IC for RF tag was connected to both ends of the coil of the antenna, and a capacitor was further connected in parallel with the IC to adjust a resonance frequency of the antenna such that the communication distance was maximum, thereby manufacturing an RF tag. An antenna of a reader/writer having an output of 100 mW (product name: "TR3-A201/TR3-D002A") manufactured by Takaya Co., Ltd., was fixed horizontally, and the RF tag was disposed such that the central axis of the coil of the RF tag was directed perpendicular to the center of the antenna of the reader/writer. The distance between the antenna of the reader/writer and the RF tag at the position where the communication therebetween was as high as possible was defined as a maximum communication distance.

On the basis of the maximum communication distance of the antenna manufactured in Comparative Example 1, the maximum communication distances of the antennas obtained in the other Examples and Comparative Example were calculated in terms of a relative value in percentage to that of Comparative Example 1. The results are shown in Table 2.

TABLE 2

| | Magnetic antenna | |
|---|---|---|
| | Maximum distance (relative value) (%) | Q (—) |
| Example 1 | 110 | 30.7 |
| Example 2 | 105 | 25.9 |
| Example 3 | 107 | 28.6 |
| Example 4 | 103 | 25.8 |
| Example 5 | 110 | 30.5 |
| Example 6 | 109 | 30.0 |
| Comparative Example 1 | 100 | 24.3 |
| Comparative Example 2 | 101 | 24.6 |

As a result of variously changing the composition of the ferrite core used in the respective antennas having the same size and structure which were obtained in the Examples according to the present invention and the Comparative Examples, it was confirmed that the antennas having such a composition as defined by the present invention were improved in communication sensitivity.

In the antenna according to the present invention, the value Q ($\mu'/\mu''$) of the ferrite core used therein is high, and it is therefore recognized that the antenna is capable of satisfying both of downsizing and improvement in communication sensitivity.

REFERENCE SIGNS LIST

1: Through-holes; 2: Electrode layer (coil electrode); 3: Core (magnetic material); 4: Coil; 5: Magnetic layer; 6: Insulating layer; 7: Conductive layer

The invention claimed is:

1. An antenna comprising an electronic component comprising a ferrite core and a coil, in which a ferrite constituting the ferrite core has a spinel structure and integrally consists of Fe, Ni, Zn, Cu and Co as integral constitutional metal elements, and when contents of the respective integral constitutional metal elements in the ferrite are calculated in terms of $Fe_2O_3$, NiO, ZnO, CuO and CoO, contents of $Fe_2O_3$, NiO, ZnO, CuO and CoO in the ferrite are 46 to 50 mol %, 20 to 27 mol %, 15 to 22 mol %, 9 to 11 mol % and 0.01 to 1.0 mol %, respectively, based on a total content of $Fe_2O_3$, NiO, ZnO, CuO and CoO, wherein a μQ product of the ferrite constituting the ferrite core as measured at 13.56 MHz is not less than 9000, and wherein CoO is not present as part of a mixture of the ferrite.

2. The antenna according to claim 1, wherein a molar ratio of Zn to Ni (Zn/Ni) in the ferrite constituting the ferrite core is 0.58 to 1.0.

3. The antenna according to claim 1, wherein a molar ratio of Ni to Cu (Ni/Cu) in the ferrite constituting the ferrite core is 2.00 to 2.50.

4. The antenna according to claim 1, wherein Q ($\mu'/\mu''$) of the ferrite core which is a ratio of a real part $\mu'$ to an imaginary part $\mu''$ of a complex magnetic permeability of the ferrite constituting the ferrite core as measured at 13.56 MHz is 50 to 170.

5. An RF tag comprising the antenna according to claim 1 to which IC is mounted.

6. The RF tag according to claim 5 which is coated with a resin.

\* \* \* \* \*